(12) United States Patent
Rwei et al.

(10) Patent No.: US 11,254,090 B2
(45) Date of Patent: Feb. 22, 2022

(54) METHOD FOR FABRICATING A SPACER FABRIC COMPOSITE HAVING A PATTERN

(71) Applicant: TSM smart materials Co., Ltd, Taoyuan (TW)

(72) Inventors: Syang-Peng Rwei, Taipei (TW); Whe-Yi Chiang, Taipei (TW); Tzu-Wei Chou, Taipei (TW)

(73) Assignee: TSM Smart Materials Co., Ltd, Taoyuan (TW)

( * ) Notice: Subject to any disclaimer, the term of this patent is extended or adjusted under 35 U.S.C. 154(b) by 215 days.

(21) Appl. No.: 16/404,752

(22) Filed: May 7, 2019

(65) Prior Publication Data

US 2019/0351645 A1 Nov. 21, 2019

(30) Foreign Application Priority Data

May 18, 2018 (TW) .................................. 107116938

(51) Int. Cl.
| | |
|---|---|
| *B32B 5/12* | (2006.01) |
| *B32B 5/02* | (2006.01) |
| *B32B 27/36* | (2006.01) |
| *B32B 27/34* | (2006.01) |
| *B32B 27/40* | (2006.01) |
| *B32B 5/26* | (2006.01) |
| *B32B 37/10* | (2006.01) |
| *B32B 37/06* | (2006.01) |
| *B32B 27/12* | (2006.01) |

(52) U.S. Cl.
CPC .............. *B32B 5/12* (2013.01); *B32B 5/024* (2013.01); *B32B 5/26* (2013.01); *B32B 27/12* (2013.01); *B32B 27/34* (2013.01); *B32B 27/36* (2013.01); *B32B 27/40* (2013.01); *B32B 37/06* (2013.01); *B32B 37/10* (2013.01); *B32B 2255/02* (2013.01); *B32B 2255/26* (2013.01); *B32B 2260/023* (2013.01); *B32B 2260/046* (2013.01); *B32B 2307/718* (2013.01)

(58) Field of Classification Search
CPC ............ A47C 31/006; D10B 2403/021; D10B 2403/022; B32B 2250/40; B32B 2255/02
See application file for complete search history.

(56) References Cited

U.S. PATENT DOCUMENTS

| | | | | |
|---|---|---|---|---|
| 5,480,697 | A * | 1/1996 | Bottger | D03D 27/10 139/386 |
| 5,514,458 | A * | 5/1996 | Schulze-Kadelbach | B32B 27/12 442/56 |
| 2007/0144221 | A1* | 6/2007 | Sytz | D04B 1/18 66/171 |
| 2015/0239206 | A1* | 8/2015 | Hsiao | B32B 3/28 428/175 |
| 2017/0099908 | A1* | 4/2017 | Lee | A43B 1/04 |

* cited by examiner

*Primary Examiner* — Carson Gross

(57) ABSTRACT

The invention provides a method for fabricating a spacer fabric composite having a pattern, fabricating machine and composite fabricated by method thereof. The method comprises a film forming step, a patterning step, a laminating step and a hole opening step.

10 Claims, 7 Drawing Sheets

METHOD FOR FABRICATING A SPACER FABRIC COMPOSITE HAVING A PATTERN

BACKGROUND OF THE INVENTION a. Field of the Invention

The invention relates to a method for fabricating a spacer fabric composite having a pattern, fabricating machine and composite fabricated by method thereof.

b. Description of the Related Art

Three-dimensional (3-D) fabrics or spacer fabrics have characteristics of being structurally strong, elastic, porous, and light-weight. Applications at all levels are being continuously developed in innovative applications such as apparels, shoe materials, transportation, construction, agriculture, and medical care. In this specification, the so-called "spacer fabric composite" means a composite composed of a spacer fabric and a resin layer coated on all or a part of surfaces of the spacer fabric. The coated resin layer can be formed from various inorganic and organic compounds, polymers, copolymers or resins. The coated layer can provide the 3-D fabric the additional functions compared to the area with no coating. The physical and/or chemical properties attributed to the coated resin layer can be achieved at the specific area of the 3-D fabric.

For example, the combination of the thermoplastic material with the 3-D fabric described in WO2006/079602 can be used as the fracture fixation device and the orthopedic casting technology is described in U.S. Pat. No. 6,482,167. Because the 3-D fabric has the characteristics of excellent air permeability and light weight, accompanying with the mechanical strength and plasticity of the thermoplastic material, it is very suitable to replace the traditional plaster as a fixation splint or support plate for bone fractures.

In addition, a 3-D fabric having a portion of its surface coated with the resin layer is particularly suitable to make various components of shoes. The definition of a spacer fabric composite having a pattern means a portion of a spacer fabric is laminated with a resin layer having a specific pattern and the resin layer has through holes coinciding with meshes of the spacer fabric and is air permeable and some portion of the spacer fabric is not laminated with any resin layer.

However, fabrication of a spacer fabric composite usually uses a coating or impregnation method. The impregnation method can only coat the whole surface of the 3-D fabric but not a portion of the surface. The usual coating method usually coats a portion of the surface or the whole surface of the 3-D fabric without any particular pattern.

BRIEF SUMMARY OF THE INVENTION

In light of the above background, in order to fulfill the requirements of the industry, one object of the invention provides a method for fabricating a spacer fabric composite having a pattern, which not only fabricates a spacer fabric composite having air permeability but also reduce production cost and promote production efficiency by continuously performing film forming, patterning and laminating to form a patterned resin layer on surfaces of a spacer fabric and then performing a hole opening process.

Furthermore, another object of the invention provides a fabricating machine for fabricating a spacer fabric composite having a pattern and provides a spacer fabric composite having a pattern which is fabricated by the above method or machine according to the present invention.

Other objects and advantages of the invention can be better understood from the technical characteristics disclosed by the invention. In order to achieve one of the above purposes, all the purposes, or other purposes, one embodiment of the invention provides a method for fabricating a spacer fabric composite having a specific pattern, using a mesh spacer fabric as a mesh substrate to form a resin layer having the pattern on the mesh substrate to fabricate a spacer fabric composite having the pattern, the method including the following steps: a film forming step to use a resin composition to form a film wherein the resin composition includes at least one polymer, random copolymer or block copolymer selected from the group consisting of the following or combination thereof: polyester, polyurethane, polyamide, and polyol; a patterning step to use a cutting device to pattern the film to form a film having the specific pattern; a laminating step to laminate the film on one side of the mesh substrate to obtain a laminated substrate; and a hole opening step to use a hole opening device to break menisci of the film between meshes of the mesh spacer fabric of the laminated substrate to obtain a spacer fabric composite having the specific pattern; wherein the mesh spacer fabric comprises a first outer layer, an intermediate spacing layer and a second outer layer, the meshes of the mesh spacer fabric after laminating the resin layer have a dimension shrinkage rate being less than 50%; the resin layer of the spacer fabric composite not only has a shape of the pattern but also possesses meshes matching the meshes of the mesh substrate; and the resin composition has Young's modulus being more than $10^8$ Pa at temperature below its melting temperature.

Furthermore, one other embodiment of the invention provides a fabricating machine for fabricating a spacer fabric composite having a specific pattern, comprising: a film forming device to make a resin composition become fluid to apply on a release film to form a coating film; a patterning device to cut the coating film to have the specific pattern; a laminating device to laminate the film having the specific pattern on one side of a mesh substrate to obtain a laminated substrate wherein the mesh substrate is a mesh spacer fabric; and a hole opening device to form throughholes on the laminated substrate to make the laminated substrate become air permeable to obtain a spacer fabric composite having the specific pattern; wherein the resin composition includes at least one polymer, random copolymer or block copolymer selected from the group consisting of the following or combination thereof: polyester, polyurethane, polyamide, and polyol and the resin composition has Young's modulus being more than $10^8$ Pa at temperature below its melting temperature; the mesh spacer fabric comprises a first outer layer, an intermediate spacing layer and a second outer layer, the meshes of the mesh spacer fabric after laminating the resin layer have a dimension shrinkage rate being less than 50%; and the resin layer of the spacer fabric composite not only has a shape of the pattern but also possesses meshes matching the meshes of the mesh substrate.

One other embodiment of the invention provides a spacer fabric composite having a specific pattern, which is fabricated by the above method or machine according to the present invention.

According to the method for fabricating a spacer fabric composite having a pattern, fabricating machine and composite fabricated by method thereof, the spacer fabric composite having a patterned resin layer and having air permeability can be continuously fabricated, the production cost can be reduced, and the production efficiency is promoted. The fabricated spacer fabric composite has the merits of light-weight, airy, excellent ability to follow the shape which the object is in contact with, and excellent operability. These characteristics of the spacer fabric composite are suitable to be applied in various application fields such as apparels, shoe materials, and transportation, construction, agriculture, and medical care. Additionally, if polyester is used as the resin composition, since the spacer fabric is also made of polyester, the spacer fabric composite of the present invention is environmentally friendly.

DETAILED DESCRIPTION OF THE INVENTION

Figure 1:
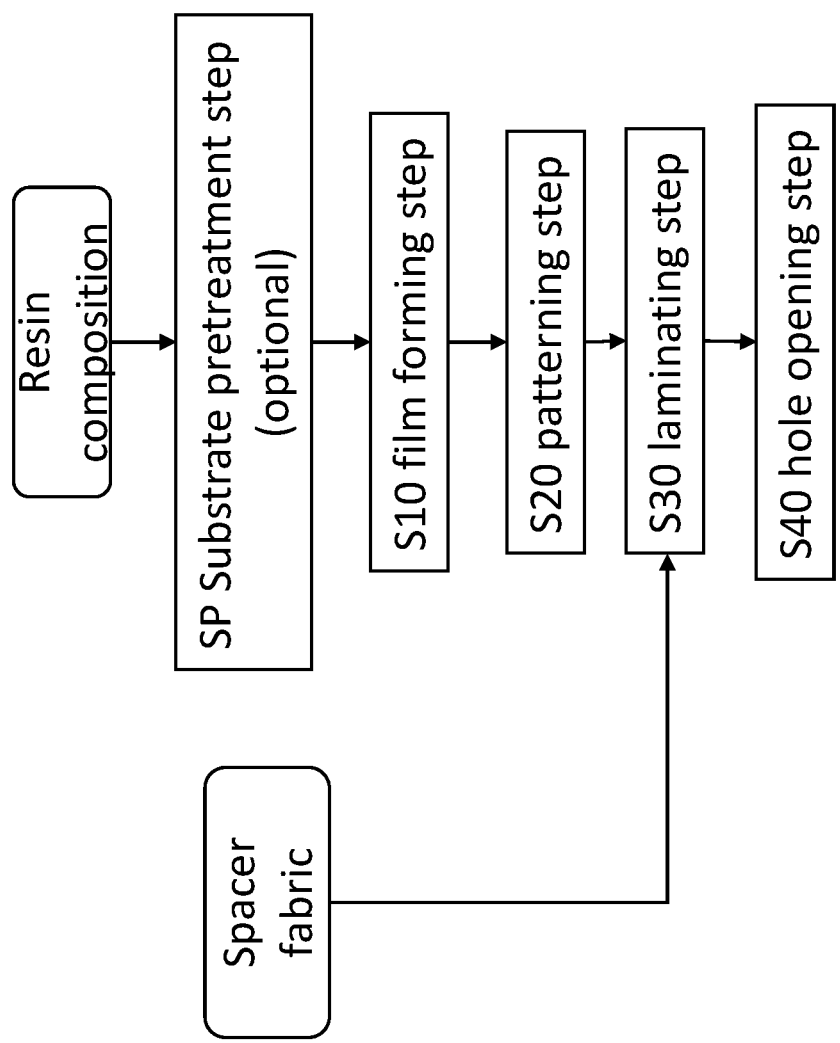
FIG. 1 shows a process flow chart illustrating a method for fabricating a spacer fabric composite having a pattern according to one embodiment of the invention.

In the following detailed description of the preferred embodiments, reference is made to the accompanying drawings which form a part hereof, and in which are shown by way of illustration specific embodiments in which the invention may be practiced. The drawings are only schematic and the sizes of components may be exaggerated for clarity. The common structures and elements that are known to everyone are not described in details to avoid unnecessary limits of the invention. In the following examples, the description of the direction, such as upper, lower, left, right, front or rear, etc., is referred to the direction of the drawing. Besides, the meaning of "A layer (or element) is on B layer (element)" includes, but not limited to, "A layer is directly laminated and contact with B layer". For example, a layer (C layer) may be existed between A layer and B layer. Some preferred embodiments of the present invention will now be described in greater detail in the following.

It is to be understood that other embodiments may be utilized and structural changes may be made without departing from the scope of the invention. Also, it is to be understood that the phraseology and terminology used herein are for the purpose of description and should not be regarded as limiting.

FIG. 1 shows a process flow chart illustrating a method for fabricating a spacer fabric composite having a pattern according to one embodiment of the invention. The method for fabricating a spacer fabric composite having a pattern according to the present invention uses a mesh spacer fabric as a mesh substrate to form a resin layer on the mesh substrate to fabricate a spacer fabric composite having a pattern. The method includes the following steps: a film forming step (S10) to use a resin composition to form a film; a patterning step (S20) to use a cutting device to pattern the film to form a film having the specific pattern; a laminating step (S30) to laminate the film on one side of the mesh substrate to obtain a laminated substrate; and a hole opening step (S40) to use a hole opening device to break menisci of the film between meshes of the mesh spacer fabric of the laminated substrate to obtain a spacer fabric composite having the specific pattern.

After the hole opening step, the method can further include a maturing step. In the maturing step, the spacer fabric composite is stored in an environment at temperature the resin composition has flowability for a predetermined period of time. The temperature the resin composition has flowability means, for example, the softening point, glass transition temperature or melting temperature or higher. Furthermore, the method can further comprise a substrate pretreatment step (SP).

Figure 2:
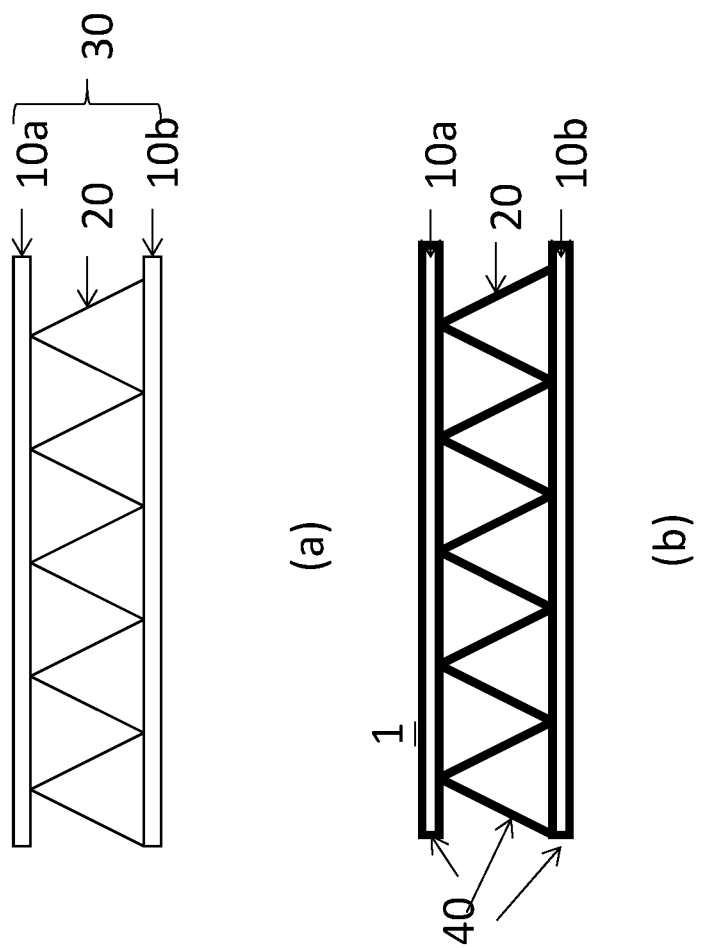
FIG. 2 shows a cross-sectional schematic diagram illustrating a spacer fabric composite according to one embodiment of the invention.
Figure 3:
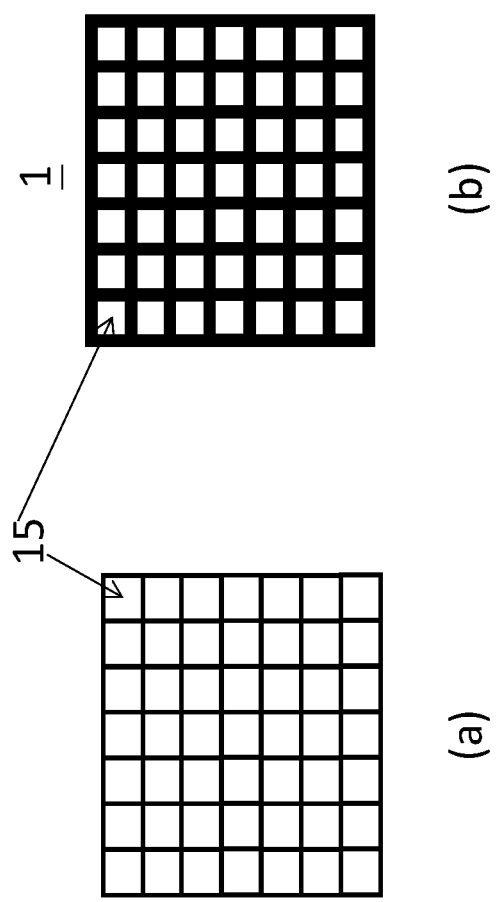
FIG. 3 shows a top-view schematic diagram illustrating the spacer fabric composite according to one embodiment of the invention shown in FIG. 2.

FIG. 2 shows a cross-sectional schematic diagram illustrating a spacer fabric composite according to one embodiment of the invention where (a) shows a spacer fabric 30 comprises two outer layers 10a and 10b, and an intermediate spacing layer 20 connecting the outer layer 10a and the outer layer 10b; and (b) shows a spacer fabric composite 1 has a shape memory polymer layer 40 which covers the surfaces of the two outer layers 10a and 10b, and the intermediate spacing layer 20. FIG. 3 shows a top-view schematic diagram illustrating a spacer fabric composite 1 shown in FIG. 2.

The spacer fabric 30 is consisted of two outer layers 10a and 10b, and an intermediate spacing layer 20 connecting the outer layer 10a and the outer layer 10b. The two outer layers 10a and 10b have meshes 50, such as rhomboid shaped meshes and the intermediate spacing layer is mono yarn. The structure of the spacer fabric is like a sandwich and thus also called "sandwich 3-D fabric". The two outer layers 10a and 10b were supported by dense networks from the intermediate spacing layer 20 and the surface meshes do not have large deformation to strengthen the mechanical property and enhance the color fastness. The spacer fabric (3-D fabric) can be extensively applied in the fields, such as cloths, shoe materials, mattresses, cap materials, air permeable pads, sports protective materials, medical composite materials. The spacer fabric 30 is commercially available.

The coating layer 40 can be formed by the method of the present invention to form on surfaces of the two outer layers 10a and 10b and the intermediate spacing layer 20. The resin composition includes at least one polymer, random copolymer or block copolymer selected from the group consisting of the following or combination thereof: polyester, polyurethane, polyamide, and polyol. It should be noted that, as shown in FIG. 3, the spacer fabric 30 still has the meshes 50 after the coating layer 40 is formed on the surfaces of the spacer fabric 30, that is the spacer fabric composite 1 according to the present invention has the three-dimensional mesh structure. The meshes 50 of the spacer fabric 30 (mesh spacer fabric) after coating the resin layer have a dimension shrinkage rate being less than 50%. The dimension of the mesh 50 (hollow hole) of the composite is smaller than that of the original uncoated spacer fabric. The hole shrinkage ratio $((D_b - D_f)/D_b)$ of the mesh 50 is preferably less than 80%, more preferably less than 50%, and further more preferably less than 40%, where $D_b$ is the average diameter of the mesh 50 before formation of the coating layer 40 and Df is the average diameter of the mesh 50 after formation of the coating layer 40. The lower the hole shrinkage ratio the higher the air permeability of the shape memory spacer fabric composite 1. Specifically, the spacer fabric composite according to the present invention can have the air permeability more than 100 cfm (ft$^3$/min) based on ASTM D737, preferably more than 300 cfm and more preferably more than 500 cfm. Along the surface of the mesh spacer fabric (the plane perpendicular to the thickness of the composite), the coating layer 40 has a contour shape matching with the specific patter.

In one embodiment, the polymer or copolymer included in the resin composition has Young's modulus more than 10$^8$ Pa at the temperature below the phase transition temperature. Furthermore, according to ASTM D790 (Standard Test Methods for Flexural Properties of Unreinforced and Reinforced Plastics and Electrical Insulating Materials), a specimen having a ratio of length/width/thickness equal to 40/4/1 is used in the three-point bending test, the testing speed is set to 15 mm/min, the ratio of the support span length to the length of the specimen is set to 16/40, and the value at the 5% deformation without breaking is the flexural strength. The spacer fabric composite has a flexural strength more than 120 MPa, preferably more than 200 MPa. The coating layer 40 is preferably made of polyesters or polyurethanes. However, the method of the present invention is not limited to use the above polymers or copolymers.

In the maturing step, after the hole opening step, the spacer fabric composite is stored in an environment at temperature the resin composition has flowability for a predetermined period of time. The temperature the resin composition has flowability means, for example, the softening point, glass transition temperature or melting temperature or higher. The duration of the maturing process depends on the processing temperature and can be for example 5 min to 24 h, preferably 10 min to 8 h, and more preferably 20 min to 2 h, considering the production efficiency. For example, it is stored at the melting temperature +10° C.~50° C. for 10 minutes-2 hours.

In the substrate pretreatment step, the mesh substrate before the coating step is passed through a pretreatment device (or means) to activate surfaces of the mesh substrate to promote adhesion between the mesh substrate and the resin composition. The pretreatment device (or means) performs treatment selected from the group consisting of the following or combination thereof: plasma treatment, corona treatment, ultraviolet radiation, ozone treatment, anchoring treatment, swelling treatment and preheating treatment. Preferably, the preheating treatment is performed.

In one embodiment, the film forming step uses an extruder to form a film from the resin composition.

In one embodiment, the hole opening device is selected from the group consisting of the following or combination thereof: contact type hole opening device and non-contact type hole opening device. The contact type hole opening device may include, for example, a plate or a roller having a needle network structure. The non-contact type hole opening device may be, for example, selected from the group consisting of the following or combination thereof: a low frequency oscillator, high frequency oscillator and oven.

In one embodiment, the laminating step uses a hot press device or a hot roller device to laminate the film on the mesh substrate.

Furthermore, in the film forming step, a coating device, hot pressing device or hot roller-type device can be used to coat a resin composition on a release film to obtain a cured resin composition film. In the patterning step, a cutting device is used to pattern the film to form a film having the specific pattern. In the laminating step, only heat or heat and pressure can be used to laminate the patterned film on the surface of the mesh substrate (mesh spacer fabric).

In one embodiment, the resin composition comprises a microwave absorbing material and the film having the pattern is laminated on the substrate through microwave. For example, the microwave absorbing material can be metal powders, carbonyl iron powders, and/or silicon carbide powders.

Furthermore, according to one other embodiment of the invention, a fabricating machine for fabricating a spacer fabric composite having a specific pattern is disclosed. The fabricating machine comprises: a film forming device (S10) to make a resin composition become fluid to apply on a release film to form a coating film; a patterning device (S20) to cut the coating film to have the specific pattern; a laminating device (S30) to laminate the film having the specific pattern on one side of a mesh substrate to obtain a laminated substrate wherein the mesh substrate is a spacer fabric; and a hole opening device (S40) to form throughholes on the laminated substrate to make the laminated substrate become air permeable to obtain a spacer fabric composite having the specific pattern. The so-called "through-hole" means hollow holes to connect two surfaces of the mesh substrate (the two outer layers of the spacer fabric) which is not limited to the hollow holes perpendicular to the two surfaces of the mesh substrate as long as the hollow hole allows air flowing between two sides of the mesh substrate.

In the coating machine, the hole opening device is selected from the group consisting of the following or combination thereof: contact type hole opening device and non-contact type hole opening device. The contact type hole opening device may include, for example, a plate or a roller having a needle network structure. The non-contact type hole opening device may be, for example, selected from the group consisting of the following or combination thereof: a low frequency oscillator, high frequency oscillator and oven.

In one embodiment, the laminating device further comprises at least one pressing roller to infiltrate the resin composition to the first and second outer layers and the intermediate layer of the mesh substrate.

In one embodiment, the film forming device is an extruder.

In one embodiment, the fabricating machine further comprises a cooling device and or a cutting device.

In one embodiment, the fabricating machine further comprises a plurality of hot rollers or heating zones and cooling zones in the path for transferring the mesh substrate during processing.

In addition, the components of the fabricating machine can be processed with release treatment, for example, surface treatment of fluoride coating or silicone coating but not limited to the above examples. For example, the plate or roller having a needle network structure is processed with release treatment. On the other hand, the components of the coating machine can be processed with surface polishing treatment.

In the above method or during use of the fabricating machine, the coating film can be formed on one or two sides of surfaces of the mesh substrate. When the coating films are formed on the two sides of surfaces of the mesh substrate, they can be formed simultaneously or separately. The thickness of the film will affect the hole opening rate and can be adjusted according to the thickness of the spacer fabric, the expected hole opening rate and the hardness of the spacer fabric composite. Generally, the thickness can be 0.02 mm-2.0 mm, preferably 0.05~1.0 mm, more preferably 0.1~1.0 mm or less than 50% of the thickness of the spacer fabric, preferably less than 20%, more preferably less than 10%. The thickness can be adjusted depending on the required strength of the composite.

Furthermore, according to one other embodiment of the invention, a spacer fabric composite is disclosed. The spacer fabric composite is fabricated by the above method or the fabricating machine of the present invention.

Figure 4:
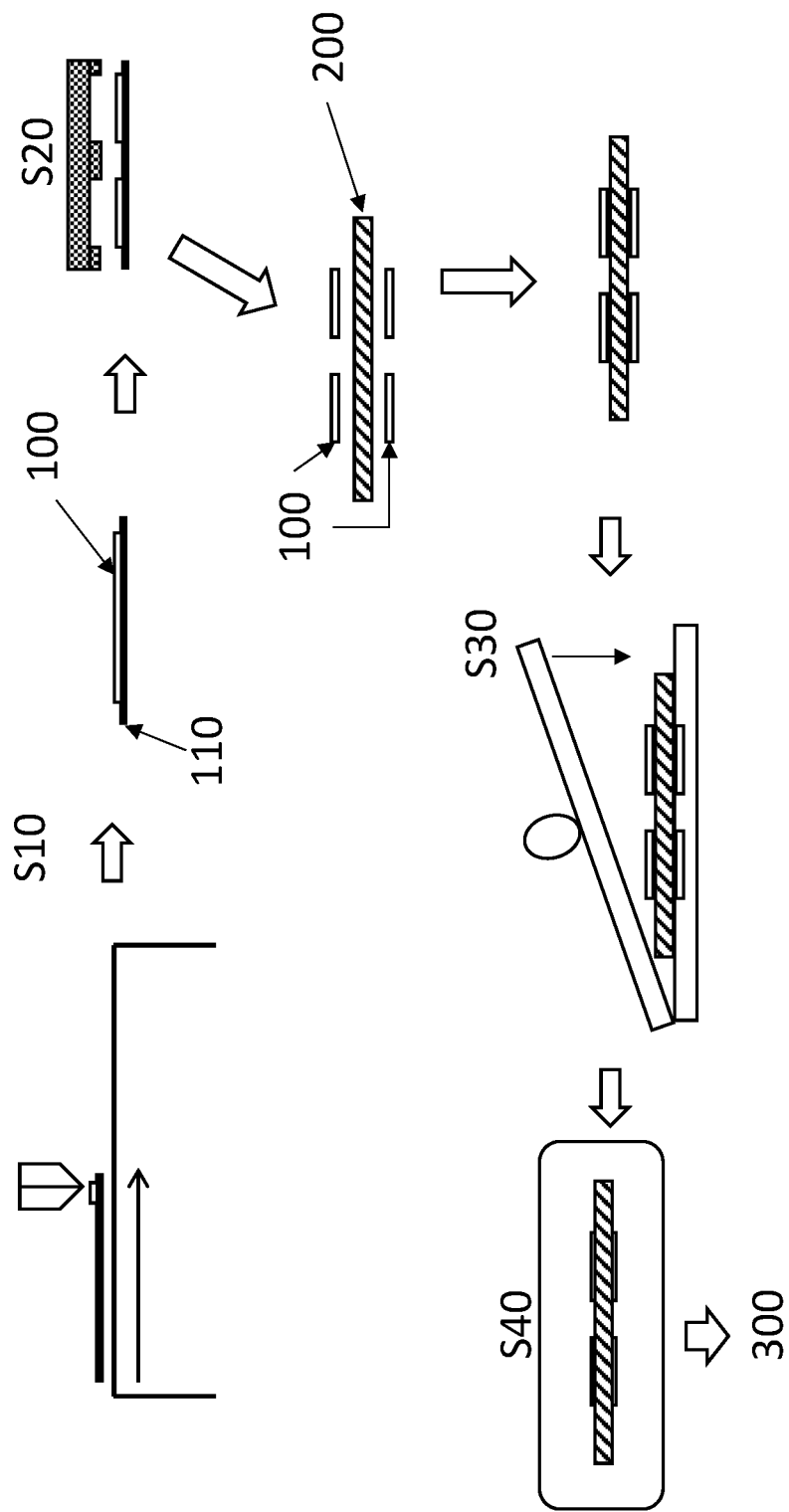
FIG. 4 shows a schematic diagram illustrating a fabricating machine according to one embodiment of the invention.

FIG. 4 shows a schematic diagram illustrating a fabricating machine according to one embodiment of the invention but the fabricating machine of the present invention is not limited to include all of the components in the figure can have various combinations and selections according to actual needs. For example, the coating machine does not include a substrate pretreatment device. The fabricating machine 100 includes a film forming device (S10), a patterning device (S20), a laminating device (S30) and a hole opening device (S40). The film forming device (S10) is a slot-die extruder to form a resin composition film 100 on a plate 110. The patterning device (S20) is a die-cut mold having a pattern, matching with the specific pattern of the spacer fabric composite, to cut the resin composition film 100 into the specific pattern. The laminating device (S30) is a plate-type hot pressing device to laminate the patterned resin composition film 100 on a spacer fabric 200. The hole opening device (S40) is an oven set at a determined temperature which the laminated substrate (resin composition film 100/spacer fabric 200/resin composition film 100) is placed in. Finally, the spacer fabric composite having the specific pattern is formed. In addition, the laminating device (S30) is not limited to the plate-type hot pressing device and can be a microwave.

Figure 5:
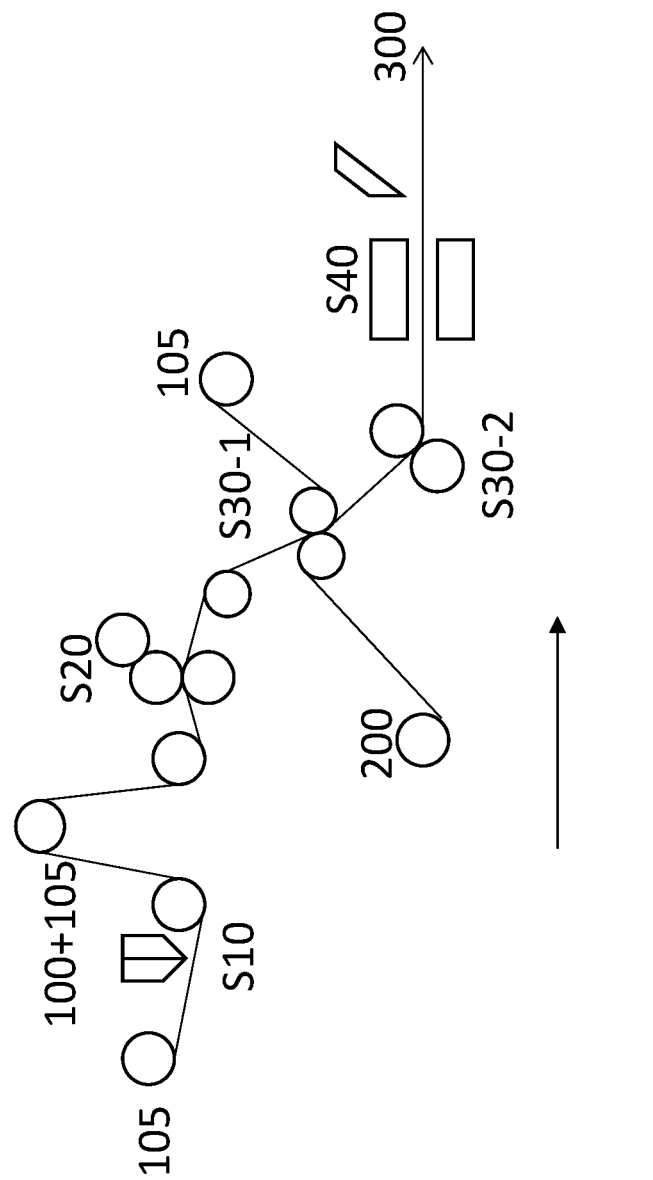
FIG. 5 shows a schematic diagram illustrating a fabricating machine according to another embodiment of the invention.

FIG. 5 shows a schematic diagram illustrating a fabricating machine according to another embodiment of the invention. As shown in FIG. 5, the fabricating machine is a roller type continuous fabricating machine to fabricate a spacer fabric composite by laminating a single resin composition layer 100. In the figure, the moving direction of the release film 105 and the spacer fabric 200 is toward the right-hand side of the figure, as shown by the arrow. At first, the release film 105 passes the film forming device and the resin composition layer 100 is formed on the release film 105. Then, it passes the patterning device S20 to obtain a patterned resin composition layer 100 on the release film 105. After passing a pair of rollers (laminating device S30-1), the patterned resin composition layer 100 is laminated with a spacer fabric 200 to obtain a laminated substrate and then the laminated substrate passes the laminating device S30-2 to be hot pressed. Finally, the laminated substrate passes the hole opening device S40 to obtain the spacer fabric composite having the specific pattern. Furthermore, the fabricating machine according to the present invention is not limited to the above examples. For example, the fabricating machine can be a machine to fabricate a spacer fabric composite by laminating two resin composition layers 100 on two surfaces of the mesh substrate (mesh spacer fabric) simultaneously or separately.

Figure 6:
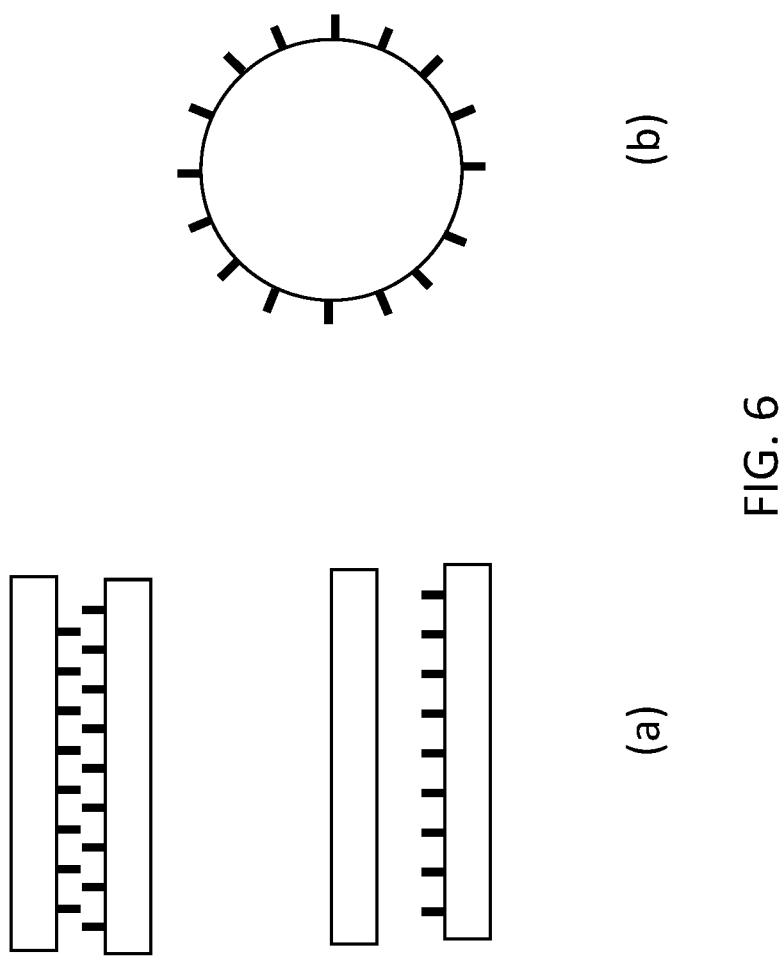
FIG. 6 shows a schematic diagram illustrating a hole opening device according to one embodiment of the invention.

FIG. 6 shows a schematic diagram illustrating a hole opening device according to one embodiment of the invention. Moreover, the hole opening device can be an oven. The above figure is only used to illustrate the present invention but not limit the scope of the present invention.

Figure 7:
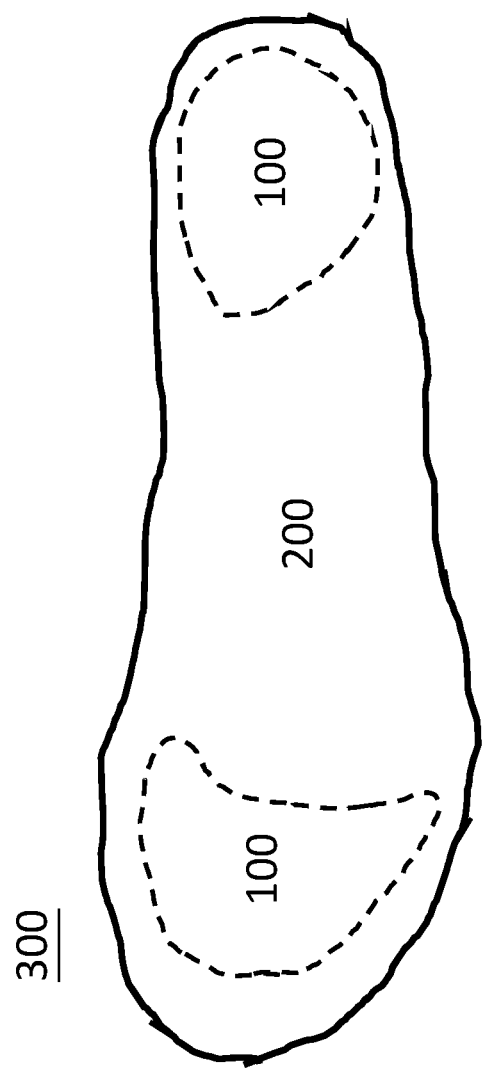
FIG. 7 shows a schematic diagram illustrating an example of the application of the spacer fabric composite of the invention.

Furthermore, FIG. 7 shows a schematic diagram illustrating an example of the application of the spacer fabric composite of the invention where the spacer fabric composite 300 is an insole. The spacer fabric composite 300 is fabricated by forming a resin composition layer 100 on a portion of the spacer fabric 200 where the resin composition layer 100 has a specific pattern as shown in the figure. However, the scope of the present invention is not limited to the example shown in FIG. 7. For example, it can be applied in various fields, such as bone fracture fixation devices, spine supporting devices, assistive devices, and functional bras.

In conclusion, according to the method for fabricating a spacer fabric composite having a pattern, fabricating machine and composite fabricated by method thereof, the spacer fabric composite having a patterned resin layer and having air permeability can be continuously fabricated, the production cost can be reduced, and the production efficiency is promoted. The fabricated spacer fabric composite has the merits of light-weight, airy, excellent ability to follow the shape which the object is in contact with, and excellent operability. These characteristics of the spacer fabric composite are suitable to be applied in various application fields such as apparels, shoe materials, and transportation, construction, agriculture, and medical care. Additionally, if polyester is used as the resin composition, since the spacer fabric is also made of polyester, the spacer fabric composite of the present invention is environmentally friendly.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Any advantages and benefits described may not apply to all embodiments of the invention. It should be appreciated that variations may be made in the embodiments described by persons skilled in the art without departing from the scope of the invention as defined by the following claims.

What is claimed is:

1. A method for fabricating a spacer fabric composite having a specific pattern, using a mesh spacer fabric as a mesh substrate to form a film having the specific pattern on the mesh substrate to fabricate a spacer fabric composite having the specific pattern, the method including the following steps:

forming the film with a resin composition, wherein the resin composition includes at least one polymer, random copolymer or block copolymer selected from the group consisting of the following or combination thereof: polyester, polyurethane, polyamide, and polyol;

patterning the film using a cutting device to form a film having the specific pattern;

laminating the film on one side of the mesh substrate to obtain a laminated substrate; and forming through-holes in the laminated substrate using a hole opening device;

wherein the mesh spacer fabric comprises a first outer layer, an intermediate spacing layer and a second outer layer, meshes of the mesh spacer fabric after laminating the film have a dimension shrinkage rate being less than 50%, and the resin composition has Young's modulus being more than 108 Pa at temperature below its melting temperature.

2. The method as claimed in claim 1, wherein the hole opening device is selected from the group consisting of the following or combination thereof: contact type hole opening device and non-contact type hole opening device.

3. The method as claimed in claim 2, wherein the contact type hole opening device includes a plate or a roller having a needle network structure.

4. The method as claimed in claim 2, wherein the non-contact type hole opening device is selected from the group consisting of the following or combination thereof: a low frequency oscillator, high frequency oscillator and oven.

5. The method as claimed in claim 1, further comprising storing the spacer fabric composite in an environment having a temperature the resin composition has flowability for a predetermined period of time after forming the through-holes.

6. The method as claimed in claim 1, further comprising pretreating the mesh substrate to activate surfaces of the mesh substrate to promote adhesion between the mesh substrate and the film.

7. The method as claimed in claim 6, wherein the mesh substrate is pretreated using a treatment selected from the group consisting of the following or combination thereof: plasma treatment, corona treatment, ultraviolet radiation, ozone treatment, anchoring treatment, swelling treatment and preheating treatment.

8. The method as claimed in claim 1, wherein the film is formed using an extruder.

9. The method as claimed in claim 1, wherein the film is laminated on the side of the mesh substrate using a hot press device or a hot roller device.

10. The method as claimed in claim 1, wherein the resin composition comprises a microwave absorbing material and the film having the specific pattern is laminated on the mesh substrate through microwave.

* * * * *